May 5, 1970 KITSUTARO AMANO ET AL 3,510,799

SEMICONDUCTOR LASER ELEMENT WHICH UTILIZES THE POLORIZATION OF ANGULARLY RELATED FORWARD BIASED JUNCTIONS TO PERFORM LOGICAL OPERATIONS

Filed Oct. 24, 1967 2 Sheets-Sheet 2

United States Patent Office 3,510,799
Patented May 5, 1970

3,510,799
SEMICONDUCTOR LASER ELEMENT WHICH UTILIZES THE POLARIZATION OF ANGULARLY RELATED FORWARD BIASED JUNCTIONS TO PERFORM LOGICAL OPERATIONS

Kitsutaro Amano, Yokohama-shi, Yasuo Koseki, Chofu-shi, Keigo Komuro, Kanagawa-ken, and Takao Tanaka and Osamu Shinbori, Tokyo-to, and Takaya Yamamoto, Kanagawa-ken, Japan, assignors to Kokusai Denshin Denwa Kabushiki Kaisha, Tokyo-to, Japan, a joint-stock company of Japan Filed Oct. 24, 1967, Ser. No. 677,682
Claims priority, application Japan, Oct. 27, 1966, 41/70,442
Int. Cl. H01s 3/06, 3/18
U.S. Cl. 331—94.5 5 Claims

ABSTRACT OF THE DISCLOSURE

A semiconductor laser element provided with a plurality of P-N junction planes arranged perpendicularly to the reflective parallel end planes each of which radiate light when an electric current exceeding a critical value flows in the forward direction of the respective P-N junction, where at least one pair of the P-N junction planes are at a right angle with respect to each other so that each of the P-N junction planes radiates a light output having either of two planes of polarization representative of binary information.

This invention relates to a semiconductor laser element.

Each of conventional semiconductor elements is usually provided with a P-N junction, a pair of polished or cloven planes arranged perpendicularly with the P-N junction, and a pair of electrodes to flow an electric current in the forward direction of the P-N junction so as to inject carriers. In the conventional semiconductor laser element, if a value of the electric current exceeds a critical value, a negative temperature results in the semiconductor material so that a coherent light is stimulatedly radiated in the plane of the P-N junction in accordance with "laser action." In this case, the radiated light is a single light of linearly polarized wave and its plane of polarization coincides with the plane of the P-N junction. If an input light is applied to the plane of the P-N junction, the stimulated emission of radiation stopped since the laser action of this element is quenched. On the contrary, if the application of the input light is stopped, the stimulated emission of radiation occurs again. These stop-and-reoccurrence response times of the stimulated emission of radiation are very short. Accordingly, if these responses would be effectively utilized, a control element capable of extremely high speed control could be realized. However, the conventional laser element is merely representative of the simple control information as mentioned above. Accordingly, if it is necessary to carry out more complex logical operation, a plurality of laser elements are to be arranged so as to meet the requirements as to the geometrically correct position-and-angle relationship. However, it is very difficult to completely satisfy the above-mentioned requirements by use of the conventional technique.

As another conventional technique, there has been proposed a gas-laser which is formed so as to take out a light output having two planes of polarization different from each other and in which logical control can be therefore carried out by representing binary information by use of the two planes of polarization. However, since the device of the gas laser is considerably large, this gas laser is not suitable to form a practical and complex logical circuitry.

An object of this invention is to provide a laser element capable of performing a binary logical operation by use of a single element.

Another object of this invention is to provide a laser element capable of performing a complex logical operation under simple formation.

Said objects and other object of this invention can be attained by the laser element of this invention, comprising a semiconductor prism having a light-resonator of reflective end parallel planes and having a plurality of P-N light emitting junction planes arranged perpendicularly to the reflective end parallel planes, at least one pair of the P-N junction planes being at an angle with respect to each other, and electrodes deposited to side planes of the semiconductor prism to apply electric voltages so as to flow electric currents in the forward directions of the P-N junctions.

According to the above-mentioned constructive principle, the laser element of this invention radiates coherent light having two planes of polarization different from each other.

Moreover, if a pair of the P-N junction planes are intersected in the semiconductor prism and interact on each other with respect to their laser actions, a coherent light which has either of two planes of polarization, parallel with the respective P-N junction planes, in accordance with any of the initial condition and an external control light or lights can be radiated from each of the P-N junction planes.

Furthermore, if a plural pairs of the angled P-N junction planes are combined in the semiconductor prism, more complex logical operations may be easily performed.

The principle of the present invention will be better understood from the following more detailed discussion taken in conjunction with the accompanying drawings, in which the same or equivalent parts are designated by the same reference numerals, characters and symbols as to one another, and in which.

Figure 1:
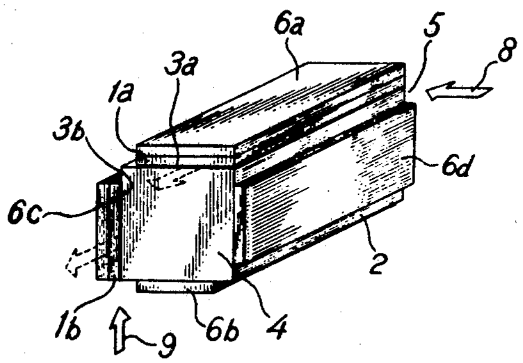
FIGS. 1 and 2 illustrate perspective views of embodiments of this invention respectively.
Figure 2:
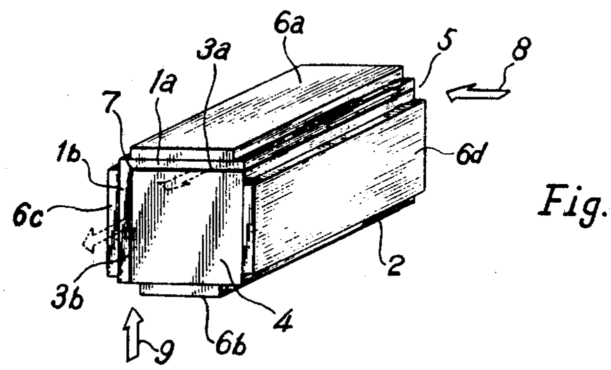

An embodiment of this invention comprises, as shown in FIG. 1, a prism 2 of P- or N-type semiconductor, two layers 1*a* and 1*b* of N- or P-type semiconductor, two pairs of electrodes (*6a, 6b*) and (*6c, 6d*). The semiconductor prism 2 has a rectangular section. Two semiconductor layers 1*a* and 1*b* are deposited at adjacent side-planes of the semiconductor prism 2, so that two P-N junction planes 3*a* and 3*b* are respectively formed between the side planes of the semiconductor prism 2 and the semiconductor layers 1*a* and 1*b*. End planes 4 and 5 of the semiconductor prism 2 are reflective parallel planes and form a light-resonator. The two pairs of electrodes (*6a, 6b*) and (*6c, 6d*) are mounted on the side planes of the prism 2 and the semiconductor layer 1*a* and 1*b* to apply electric voltages exceeding respective critical values for "laser action" of the P-N junction planes 3*a* and 3*b*. In the embodiment of FIG. 1, the P-N junction planes 3*a* and 3*b* are arranged at right angle but not intersected with each other in the element. In the embodiment of FIG. 2, the P-N junction planes 3*a* and 3*b* are arranged at right angle and intersected with each other at an edge 7 of the semiconductor prism 2. Any type of P-N junction can be employed as the P-N junction planes 3*a* and 3*b* so far as it is suitable to "laser action." By way of example, the P-N junction may be formed by diffusing zinc (Zn) into N-type gallium arsenide (Ga As) doped with tellurium (Te). Another example of the P-N junction planes are produced by epitaxial vapour growth from N-type gallium-arsenide (Ga As) containing zinc (Zn) as impurity. The resonator of reflective parallel planes may be produced by a conventional cleavage method.

Figure 3:
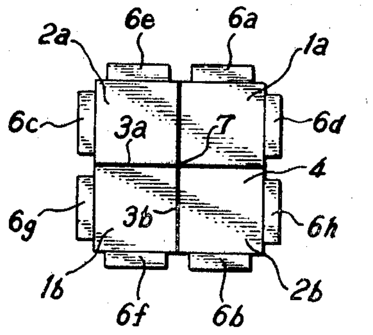
FIG. 3 is an elevational view of an embodiment of this invention.

FIG. 3 illustrates another example of this invention, in which the P-N junction planes 3*a* and 3*b* are intersected at the right angle with each other substantially at the center axis of the semiconductor prism 2. In this embodiment, there are provided with four pairs of electrodes (6*a*, 6*b*), (6*c*, 6*d*), (6*e*, 6*f*) and (6*g*, 6*h*).

As the result of the above-mentioned construction, the laser element of this invention can perform the following operations:

(i) In the embodiment shown in FIG. 1 in which a pair of the P-N junction planes 3*a* and 3*b* are not intersected on the semiconductor prism 2, each of the P-N junction planes radiates independently a light output which has a plane of polarization parallel with the respective P-N junction plane 3*a* or 3*b* if an electric current exceeding the critcal value is flowed in the respective P-N junction plane 3*a* or 3*b*. In this case, if an input light is applied from the direction shown by an arrow 8, the laser action of the P-N junction plane 3*a* is qnenched and the laser action of the P-N junction 3*b* only is therefore continued. Accordingly, only a light output having a plane of polarization parallel with the P-N junction plane 3*b* will be radiated. On the contrary, if an input light is applied from the direction shown by an arrow 9, the laser action of the P-N junction plane 3*a* is quenched and the laser action of the P-N junction 3*a* only is therefore continued. Accordingly, only a light output having a plane of polarization parallel with the P-N junction plane 3*a* will be radiated. In other words, the laser element of FIG. 1 radiates a light output having either of two planes of polarization which correspond to binary information.

(ii) In the embodiment shown in FIGS. 2 and 3 in which a pair of the P-N junction planes 3*a* and 3*b* are intersected on or in the semiconductor prism 2, either one of the P-N junction planes 3*a* and 3*b* radiates its light output in accordance with the initial condition of this case. Accordingly, the laser action of the other of the P-N junction planes 3*a* and 3*b* is quenched by the light output mentioned above, so that the quenched P-N junction 3*a* or 3*b* cannot radiate its output light. In other words, only one of the P-N junction 3*a* and 3*b* radiates its light output. The radiation of light output of this embodiment can be carried out as mentioned below. In case the P-N junction plane 3*a* radiates its light output, an input light is applied from the direction shown by the arrow 8. The laser action of the P-N junction plane 3*a* is quenched by the applied input light, so that the light output of the P-N junction plane 3*a* is stopped. Accordingly, the laser action of the P-N junction plane 3*b* which has been quenched by the light output of the P-N junction plane 3*a* starts, and the P-N junction plane 3*b* radiates a light output having a plane of polarization parallel with this P-N junction plane 3*b*. This light output of the P-N junction plane 3*b* continues even if the input light from the direction of the arrow 8 is removed, since the light output of the P-N junction plane 3*b* quenches continuously the laser action of the P-N junction plane 3*a*. On the contrary, the light output of the P-N junction plane 3*b* can be switched to the P-N junction plane 3*a* by application of an input light from the direction shown by the arrow 9. The operation of this switching can be easily understood on reference to the above operation, so that details are omitted. As mentioned above, this embodiment operates as a bistable element in which its bistable conditions correspond respectively to two planes of polarization of the light output.

As mentioned above, the plane of polarization of the light output of the laser element according to this invention can be controlled by an input light. Accordingly, the laser element of this invention is able to carry out logical operation in which binary information corresponds respectively to the two planes of polarization of the light output. Actual examples of these logical operations will be described with reference to FIGS. 4 and 5.

Figure 4:
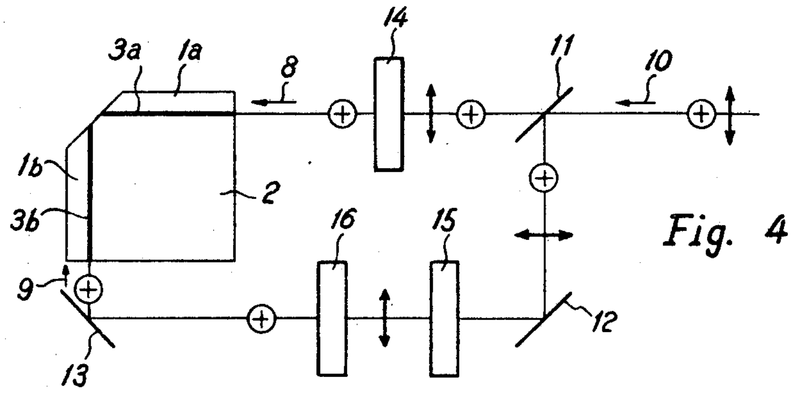
FIGS. 4 and 5 are circuit diagrams each for describing the operation principle of a circuit formed by use of an embodiment of this invention.

In a circuit shown in FIG. 4, an input light applied from an arrow 10 is divided by a half mirror 11 into two input lights, one of which is applied to the P-N junction plane 3*a* through a polarizer 14 transmissible of a light having a plane of polarization parallel with the P-N junction 3*a* (this light herein referred as light "0" corresponding to the binary digit "0"), the other of which is applied to a mirror 12 and changes its course by the reflection of the mirror 12. The reflected light is passed through polarizer 15 and a plate 16 and applied to the P-N junction planes 3*b* after changing its course at a mirror 13. The plate 16 rotates the plane of polarization of its input light by the right angle. The polarizer 15 transmits an input light having a plane of polarization which coincides with the P-N junction plane 3*b* (this light herein referred as light "1" corresponding to the binary digit "1"). In FIG. 4, each of marks (↕)

represents a light having a plane of polarization parallel with the plane of the drawings, and each of marks (⊕) represents a light having a plane of polarization perpendicular to the plane of the drawings.

In this circuit shown in FIG. 4, if an input light "0" is applied from the direction of the arrow 10, the laser action of the P-N junction plane 3*a* is quenched and the P-N junction plane 3*b* radiates therefore a light output "1." On the contrary, if an input light "1" is applied from direction of the arrow 10, the laser action of the P-N junction plane 3*b* is quenched and the P-N junction plane 3*a* radiates therefore a light output "0." Accordingly, this circuit of FIG. 4 is a "NOT" circuit.

Figure 5:
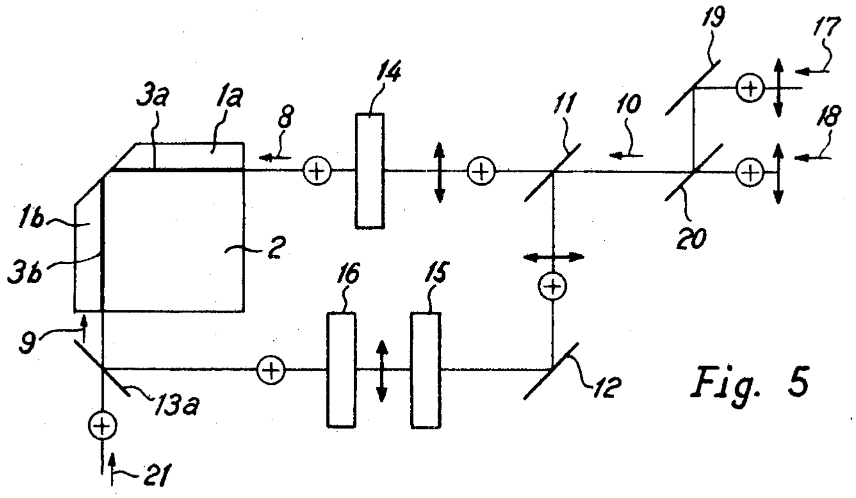

In a circuit shown in FIG. 5, a mirror 19 and a half mirror 20 are further provided to receive input lights from the directions of the arrows 17 and 18 respectively. Moreover, a half mirror 13*a* is employed to transmit a constant light from an arrow 21. In this circuit, the intensity of each of the control lights from the directions 17, 18 and 21 is set at a value so that only one control light cannot quench any of the laser actions of the P-N junction planes 3*a* and 3*b* but two or more of the control lights can quench either of laser actions of the P-N junction planes 3*a* and 3*b* as mentioned below. Namely, if an input light "0" is applied from the direction 17 and an input light "0" is applied from the direction 18, the laser action of the P-N junction plane 3*b* is quenched and a light output "1" is radiated from the P-N plane 3*a*. On the contrary, if (i) an input light "0" is applied from the direction 17 and an input light "0" is applied from the direction 18, or (iii) an input light "1" is applied from the direction 17 and an input light "1" is applied from the direction 18, the laser action of the P-N junction plane 3*a* is quenched and the light output "0" is radiated from the P-N junction plane 3*b*. Accordingly, this circuit operates as a NOR circuit.

By combining these two kinds of logical circuits, i.e. NOT circuit and NOR circuit, a more complex logical circuit can be easily provided.

Figure 6A:
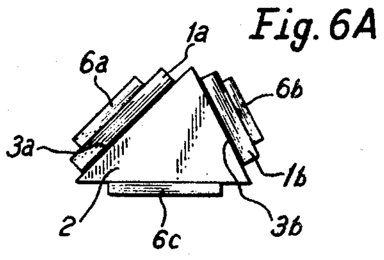
FIGS. 6A and 6B are elevational views each illustrating an embodiment of this invention.

In the above-mentioned embodiments, a pair of P-N junction planes incline at the right angle with each other. However, it is not essential that the pair of P-N junction planes 3*a* and 3*b* are at right angles with respect to each other as long as they are at some angle with respect to each other. FIG. 6A shows an example of this type, which comprises a semiconductor triangular prism 2 of N- or P-type, two semiconductor layers 1*a* and 1*b* of P- or N-type, two P-N junction planes 3*a* and 3*b*, electrodes 6$a$, 6$b$ and 6$c$. The operation principle of this embodiment can be easily understood on reference to the embodiments FIGS. 1, 4 and 5, so that details are omitted.

Figure 6B:
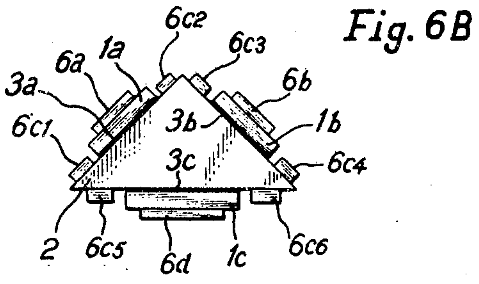

According to further features of this invention, the laser element of this invention can be provided with a plurality of P-N junctions each radiatable of a light output having either of two planes of polarization. As the result of this construction, the laser element of this invention is representable of multinary information. FIG. 6 shows an embodiment according to this principle, which comprises a semiconductor triangular prism 2 of P- or N-type, three semiconductor layers 1$a$, 1$b$, and 1$c$, three P-N junction planes 3$a$, 3$b$, and 3$c$, a set of electrodes 6$a$, 6$b$, and 6$d$ on the semiconductor layers 1$a$, 1$b$, and 1$c$ respectively, and a set of electrodes $6_{c1}$, $6_{c2}$, $6_{c3}$, $6_{c4}$, $6_{c5}$ and $6_{c6}$ on the semiconductoor prism 2. In this embodiment, the P-N junction planes 3$a$, 3$b$ and 3$c$ may be intersected similarly as the embodiments of FIGS. 2 and 3 to perform more complex logical operation.

What we claim is:

1. A semiconductor laser element, comprising a semiconductor body having side planes and a light resonator comprising reflective parallel end planes and having a plurality of P-N junction planes arranged perpendicularly to the reflective parallel end planes for radiating stimulated emission, at least one of said P-N junction planes being at an angle with respect to a second of said P-N junction planes, and electrodes deposited on said side planes of the semiconductor body to apply forward bias electric voltages to the P-N junctions for generating coherent radiation.

2. A laser element according to claim 1, in which said two P-N junction planes are arranged at right angles with respect to each other.

3. A laser element according to claim 2, in which the semiconductor body has a rectangular cross-section, with each of said two P-N junction planes in parallel with an adjacent one of said side-planes.

4. A laser element according to claim 2, in which said two P-N junction planes arranged at a right angle with respect to each other do not intersect each other in the semiconductor body.

5. A laser element according to claim 2, in which said two P-N junction planes arranged at a right angle with respect to each other intersect each other in the semiconductor body.

References Cited

UNITED STATES PATENTS

| | | |
|---|---|---|
| 3,305,685 | 2/1967 | Wang. |
| 3,359,508 | 12/1967 | Hall. |
| 3,427,563 | 2/1969 | Lasher. |
| 3,430,160 | 2/1969 | Kosonocky. |
| 3,431,437 | 3/1969 | Kosonocky. |
| 3,431,513 | 3/1969 | Nannichi. |
| 3,439,289 | 4/1969 | Kosonocki. |

RONALD L. WIBERT, Primary Examiner

E. BAUER, Assistant Examiner

U.S. Cl. X.R.

307—312; 317—235